(12) United States Patent
Baker

(10) Patent No.: US 11,155,044 B2
(45) Date of Patent: Oct. 26, 2021

(54) ZIP STRIPS FOR MOLDING OF INFUSED FIBERGLASS PRODUCTS

(71) Applicant: TPI Composites, Inc., Warren, RI (US)

(72) Inventor: Kirk M. Baker, Broomfield, CO (US)

(73) Assignee: TPI Composites, Inc., Warren, RI (US)

(*) Notice: Subject to any disclaimer, the term of this patent is extended or adjusted under 35 U.S.C. 154(b) by 373 days.

(21) Appl. No.: 16/129,537

(22) Filed: Sep. 12, 2018

(65) Prior Publication Data
US 2019/0337200 A1    Nov. 7, 2019

Related U.S. Application Data

(60) Provisional application No. 62/667,068, filed on May 4, 2018.

(51) Int. Cl.
| | | |
|---|---|---|
| B29C 65/00 | (2006.01) | |
| B29C 43/36 | (2006.01) | |
| B29C 70/54 | (2006.01) | |
| B29C 70/52 | (2006.01) | |
| B29L 31/08 | (2006.01) | |

(52) U.S. Cl.
CPC .... B29C 66/81455 (2013.01); B29C 43/3642 (2013.01); B29C 70/527 (2013.01); B29C 70/54 (2013.01); B29C 2043/3644 (2013.01); B29L 2031/085 (2013.01)

(58) Field of Classification Search
None
See application file for complete search history.

(56) References Cited

U.S. PATENT DOCUMENTS

| | | |
|---|---|---|
| 3,301,687 A | 1/1967 | Davy |
| 3,469,766 A | 9/1969 | Nelson |
| 5,316,462 A | 5/1994 | Seemann |
| 2009/0051076 A1 | 2/2009 | Kofoed et al. |

OTHER PUBLICATIONS

International Search Report and Written Opinion for International Application No. PCT/US18/50679 dated Nov. 6, 2018.

*Primary Examiner* — Christopher T Schatz
(74) *Attorney, Agent, or Firm* — Foley Hoag LLP; Stephen J. Kenny

(57) ABSTRACT

A method of removing a vacuum bag from a composite mold. Removable strips are placed around the perimeter of the component parts and across the parts to create natural break points in the consumable materials used during manufacture of a composite product, e.g. wind turbine blade. The vacuum bag, and other consumable layers, are placed over the removable strip such that when the strips are pulled, the strip tears, in a controlled and complete manner, through each layer of consumables. This eliminates the need to use a knife/scissor to remove the finished product, thereby avoiding risk of injury.

20 Claims, 8 Drawing Sheets

ZIP STRIPS FOR MOLDING OF INFUSED FIBERGLASS PRODUCTS

CROSS-REFERENCE TO RELATED APPLICATIONS

This application claims the benefit under 35 USC 119 of priority to U.S. Provisional Application No. 62/667,068 filed May 4, 2018, the entire contents of which are hereby incorporated by reference.

BACKGROUND OF THE DISCLOSED SUBJECT MATTER

Field of the Disclosed Subject Matter

The disclosed subject matter relates to a system and corresponding method for the manufacture of fiber reinforced polymer composite manufacturing, e.g., wind turbine blades. Particularly, the present disclosed subject matter provides for a novel technique for disassembling the apparatus, e.g. vacuum bag(s), employed during manufacture of composite products.

DESCRIPTION OF RELATED ART

A variety of methods and systems are known for the manufacture of wind turbine blades. Generally, Vacuum Assisted Resin Transfer Molding (VARTM) process is widely used in the manufacture of wind turbine blades because of the lower cost compared to autoclaving. During the process of filling the mold, a vacuum which is underpressure or negative pressure, is generated via vacuum outlets in the mold cavity, whereby liquid polymer is drawn into the mold cavity via the inlet channels in order to fill the mold cavity. From the inlet channels the polymer disperses in all directions in the mold cavity due to the negative pressure as a flow front moves towards the vacuum channels. Vacuum infusion techniques typically employ a rigid mold part and a resilient mold part in the form of a vacuum bag.

Resin transfer molding (RTM) is a manufacturing method, which is similar to VARTM. In RTM the liquid resin is not drawn into the mold cavity due to a vacuum generated in the mold cavity. Instead the liquid resin is forced into the mold cavity via an overpressure at the inlet side.

Prepreg molding is a method in which reinforcement fibers are pre-impregnated with a pre-catalysed resin. The resin is typically solid or near-solid at room temperature. The prepregs are arranged by hand or machine onto a mold surface, vacuum bagged and then heated to a temperature, where the resin is allowed to reflow and eventually cured. This method has the main advantage that the resin content in the fiber material is accurately set beforehand. The prepregs are easy and clean to work with and make automation and labor saving feasible. The disadvantage with prepregs is that the material cost is higher than for non-impregnated fibers. Further, the core material need to be made of a material, which is able to withstand the process temperatures needed for bringing the resin to reflow. Prepreg molding may be used both in connection with a RIM and a VARTM process.

Some exemplary infusion techniques are disclosed in U.S. Pat. Nos. 9,599,094 and 8,123,883, the entirety of each is hereby incorporated by reference. Such conventional techniques require substantial cutting of the vacuum bag to remove the bag from the mold upon completion of the resin curing. This is undesirable in that the cutting operation is typically performed manually, thereby putting employees at risk of injury. Additionally, the conventional cutting techniques require significant tooling and complimentary mold structure (e.g. peripheral cutting channel 26 as disclosed in U.S. Pat. No. 8,123,883) in an attempt to avoid damage to the manufactured part.

There thus remains a need for an efficient and economic method and system for vacuum bag removal that avoids the aforementioned disadvantages associated with conventional cutting and bag removal techniques. In the manufacturing of wind turbine blades, which are large components, there is a substantial amount of knife work necessary to cut consumables into manageable size pieces for removal. Using this process it eliminates 99% of the knife work. In addition it provides an ideal surface finish for applying tacky tape for a perimeter bag to retain the part in the mold.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of removing a vacuum bag from a wind turbine blade mold comprising: forming a wind turbine blade component within a mold; providing at least one removable strips, the removable strip(s) disposed around at least a portion of the perimeter of a component part(s), disposing at least one consumable layer(s) above a removable strip; disposing a portion of a vacuum bag above a removable strip; pulling the removable strip, the pulling force tearing through the consumable layer(s) and the vacuum bag.

In some embodiments, the removable strip tears through the consumable layers in a predetermined path, and has thickness of approximately 0.028 inches, a width of approximately 0.5 inches, a break strength of approximately 820 pounds, and a melting point of approximately 490° Fahrenheit.

In some embodiments, at least one removable strip(s) is placed directly on glass. Once all the removable strips are removed, the consumable layer(s) and vacuum bag are tied with the removable strips.

In some embodiments, the removable strips impart a recess in the component part after removal, and a tacky tape is then applied at/within the recess.

In some embodiments, at least one removable strip(s) is disposed around the mold on a clamp edge between a top clamp edge and a bottom clamp edge.

In some embodiments, at least one removable strip(s) has a first end disposed at 1.5 m from the root end of the blade and extends to the tip on both a leading edge and trailing edge side of the molds.

In some embodiments, the removable strip includes a handle at the end of the removable strip.

In some embodiments, removable strips are disposed at approximately 1,500 mm, 12,000 mm, and 27,500 mm from the root end.

In some embodiments, the removable strip is dispensed from a dispensing cart, wherein the dispensing cart is external to the blade mold and translates along the blade span with the removable strips dispensed laterally into the mold.

In some embodiments, the dispensing cart is disposed above the mold, with the removable strips dispensed downwardly into the mold. In some embodiments, a segment of a removable strip is dispensed proximate the root and extended to the tip of mold. Additionally or alternatively, the removable strip is installed onto the mold flange and cut at the 1.5 m mark from the root.

In some embodiments, the spar cap and mold split lines remain free of any removable strips. Additionally, an opening can be formed in the vacuum bag to access the end of the removable strip.

In some embodiments a guide to create a predefined flow path for resin distribution is employed, wherein the removable strip does not break through the guide upon removal.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
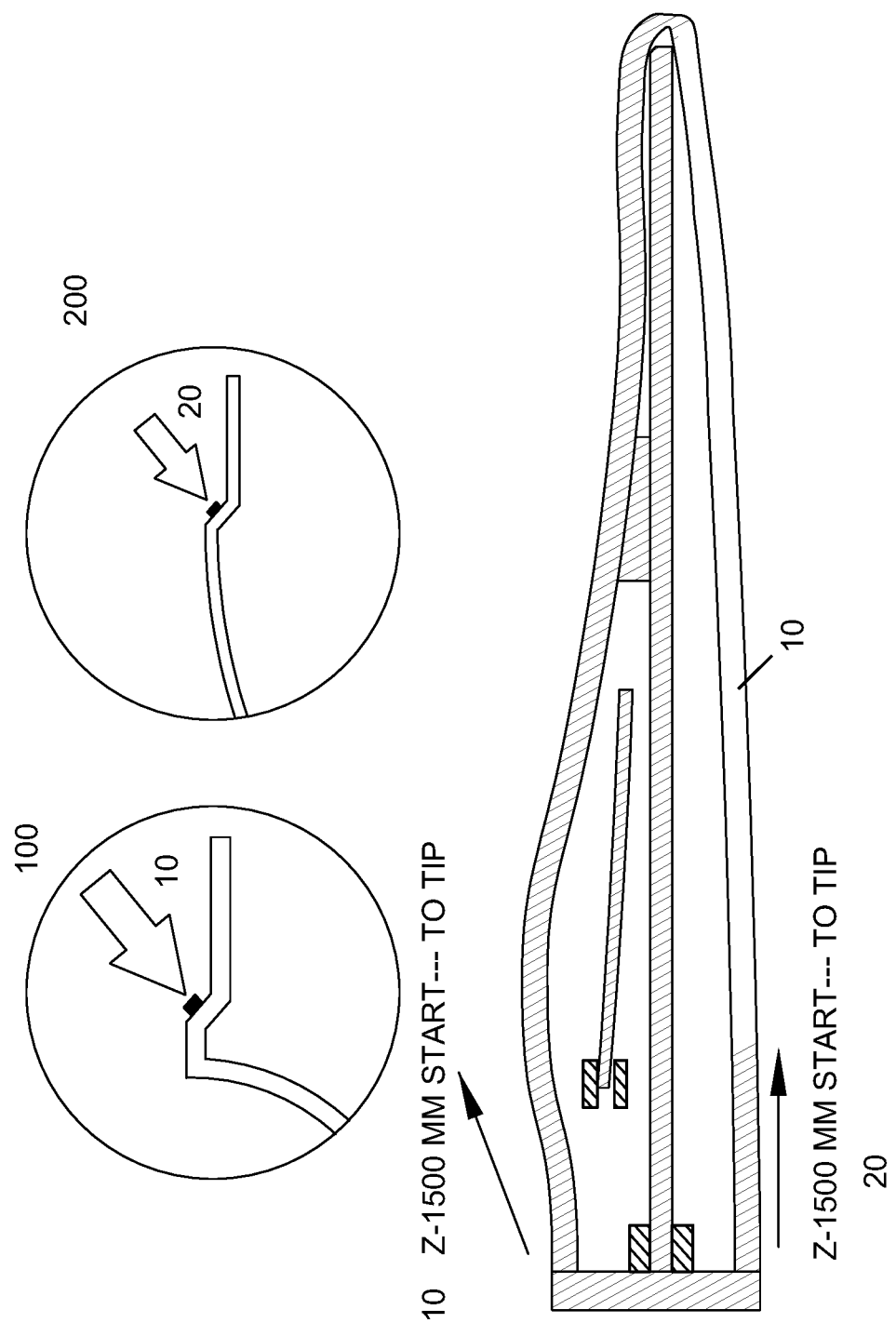
FIG. 1 depicts an exemplary embodiment of vacuum bag removal for a wind turbine blade mold.

Reference will now be made in detail to exemplary embodiments of the disclosed subject matter, an example of which is illustrated in the accompanying drawings. The method and corresponding steps of the disclosed subject matter will be described in conjunction with the detailed description of the system.

In accordance with an aspect of the disclosure, a method of removing a vacuum bag from a composite mold is provided. Removable strips are placed around the perimeter of the component parts and across the parts to create natural break points in the consumable materials used during manufacture of a composite product, e.g. wind turbine blade. The vacuum bag, and other consumable layers, are placed over the removable strip such that when the strips are pulled, the strip tears, in a controlled and complete manner, through each layer of consumables. This eliminates the need to use a knife/scissor to remove the finished product, thereby avoiding risk of injury.

In some embodiments, the removable strips are configured as zip strips as a means to quickly remove bagging and consumable materials from a cured part. The removable strip strapping dimensions are variable according to the process it is applied to and ease of use. For purpose of illustration and not limitation, one embodiment of the strapping had a thickness of 0.028", break strength 820 LBS, melting point 490° F., width 0.5", however it is to be understood that the particular structural characteristics of the removable strips can vary according to the application and particular components being manufactured.

In operation, the removable zip strip(s) are placed on non-sanding tape and positioned directly on glass (glass fiber) where non-sanding tape is not present. Release film perforated, Release Ease Teflon, Omega, Green Flow Media, and vacuum bag are all placed over the top of these materials. After the turbine blade part is infused with resins and cured the end of the removable zip strips are cut free from the consumables and then pulled (e.g. manually) out of the manufactured part. The action of pulling the zip strips out of the infused part tears through all the consumables. Additionally, the zip strips provide for a predictable and controllable tear line so that undesired deviation and damage to neighboring components or materials is avoided.

In accordance with an aspect of the disclosure, the removable zip strips are easily removed from the manufactured part, sections out the consumables used during manufacture, and eliminates the need to cut with a knife or other tool which greatly reduces the risk of injury. Further, once all the removable zip strips are removed the consumables are removed from the part and bundled up with the removable zip strips used as strapping to tie the consumables together. In addition to the removal of consumables along the perimeter of blade skins (half a wind blade) the removable zip strips leave an impression where removed that is slick and creates an ideal location for tacky tape to be applied for a perimeter bag (in order to retain the shell in mold) installation.

In an exemplary embodiment of the disclosure, the disclosed process assists in disassembly and removal of equipment and consumables employed during manufacture of composite products, e.g., debagging on skin molds. A removable zip strip(s) (10, 20) is placed around the mold on a clamp edge between a top clamp edge (100) and a bottom clamp edge (200) as shown in the zoom-in views captioned in FIGS. 1-3. As shown, removable zip strips start at 1.5 m from the root end of the blade and run to the tip on both leading edge (LE) and trailing edge (TE) side of the molds. However, in some embodiments the removable strip can be placed at the root of the mold, and across the root of the mold such that the removable strips completely encompass or surround the perimeter of the mold. An adhesive, or takifier, can be used to attach the removable zip strips to the glass fiber and the non-sanding tape (NST), which can include a fabric material to serve as a secondary bonding surface on parts of a fiberglass part. The terminal ends of the removable zip strip can be wrapped with a material, e.g. duct tape, that allows both for easy visual identification as well as manual gripping. Additionally, a handle 15, 25, 35 or pull tab can be included at the end of the removable strip to facilitate tearing/removal. In some embodiments the entirety of the removable strips lie entirely under the vacuum bag, and can only be accessed after curing of the resin and cutting into the vacuum bag.

Figure 2:
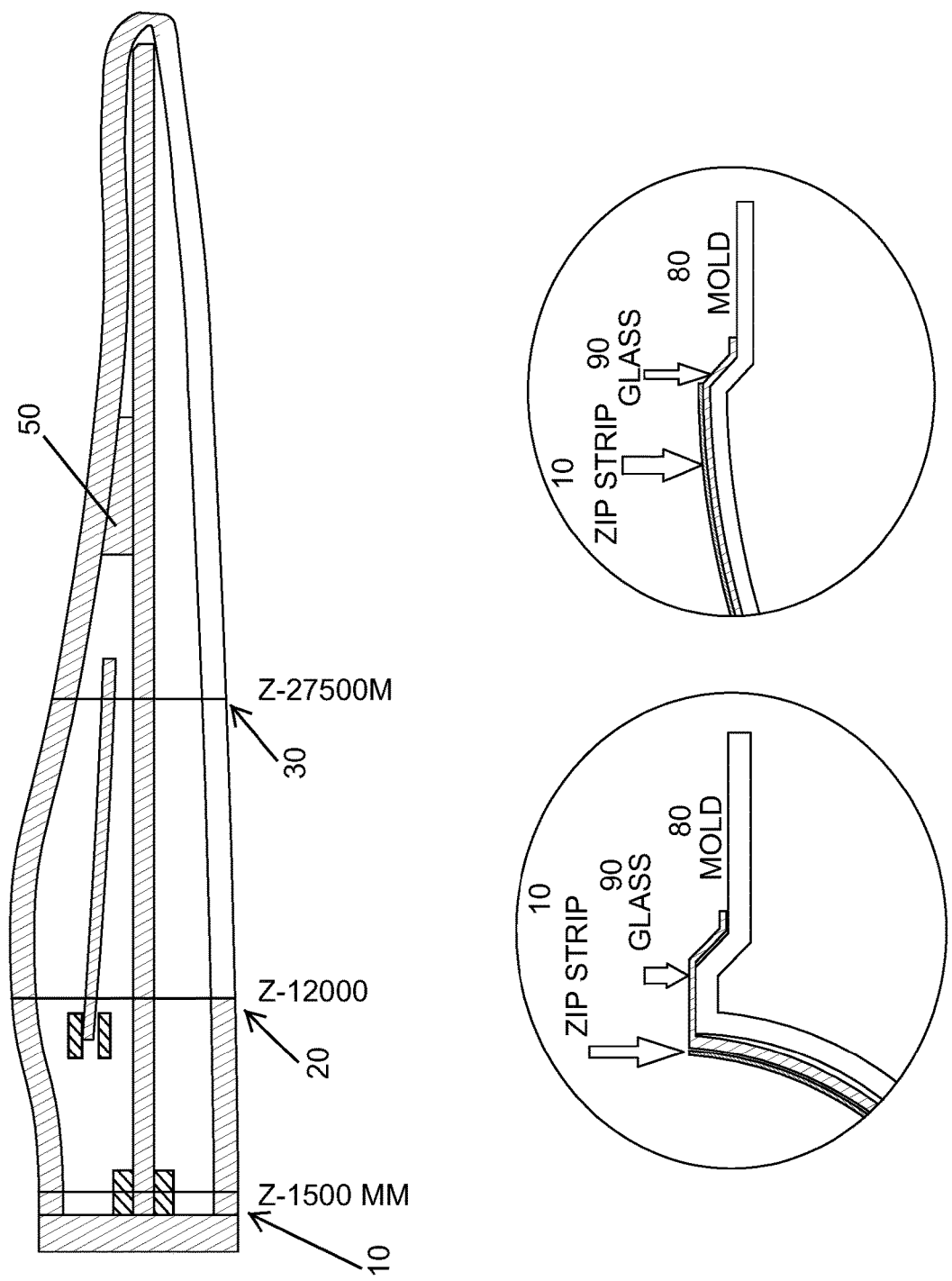
FIG. 2 depicts an exemplary embodiment of vacuum bag removal for a wind turbine blade mold with a glass fiber layup segment.
Figure 3:
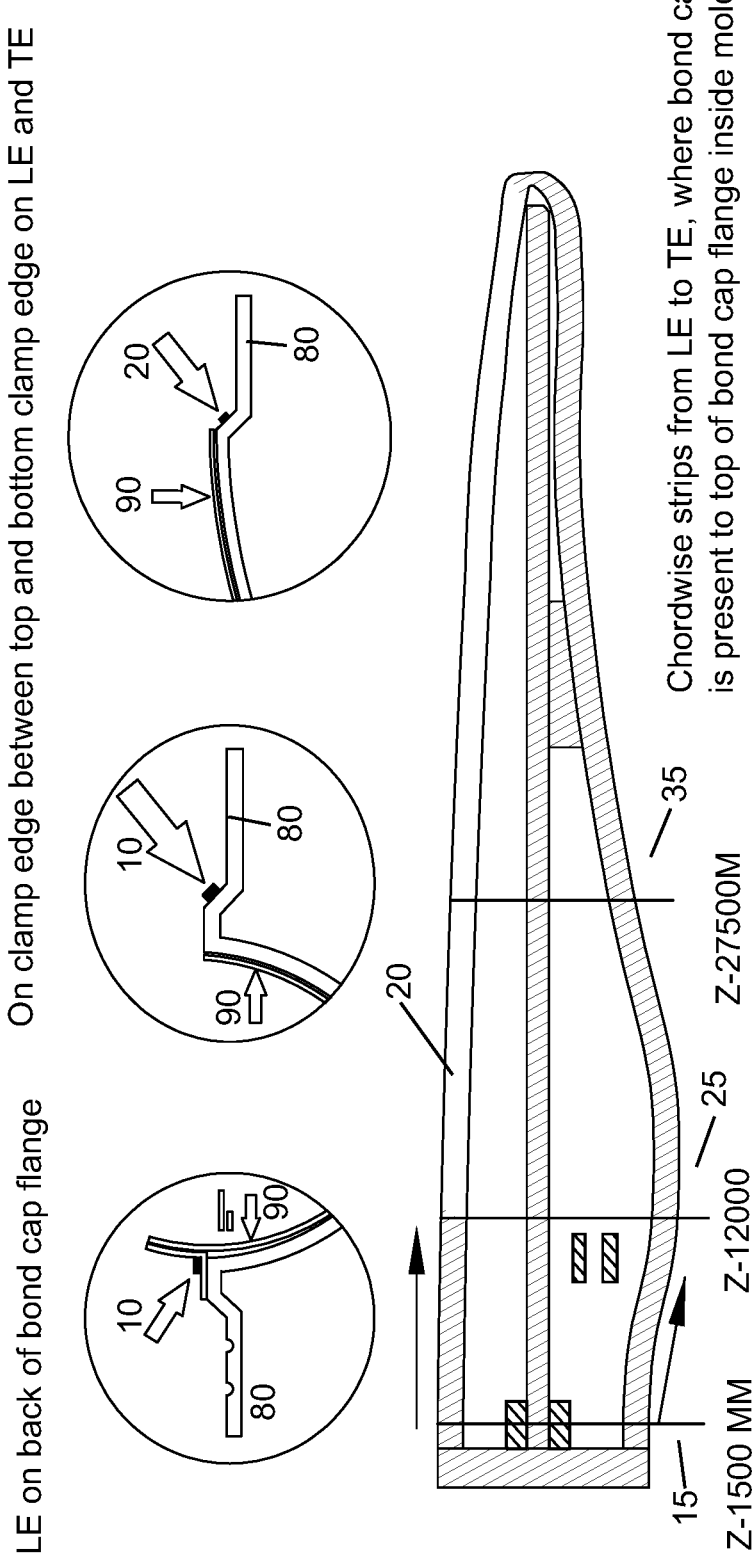
FIG. 3 depicts an exemplary embodiment of vacuum bag removal for a wind turbine blade mold with a bond cap flange.
Figure 4:
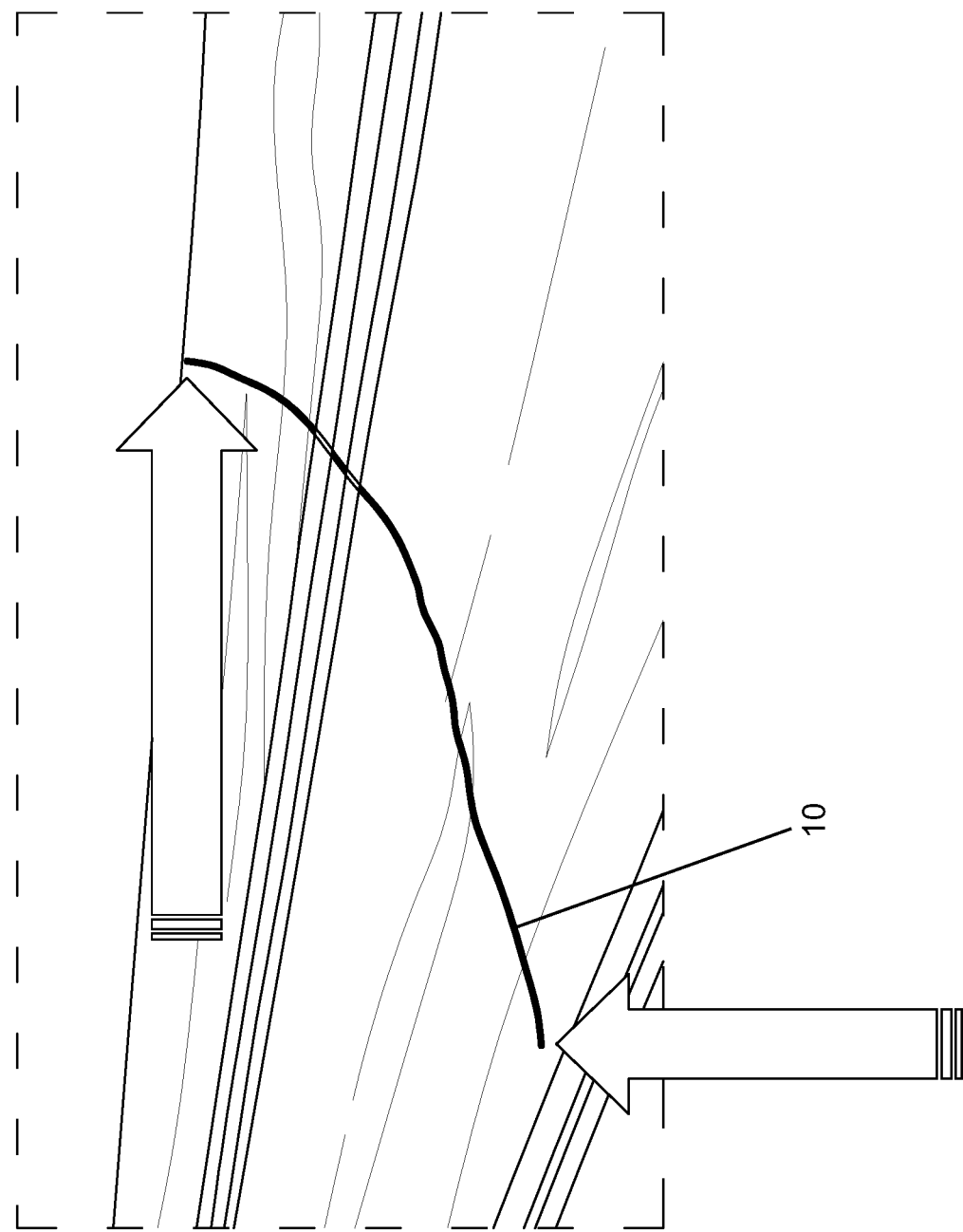
FIGS. 4-7 depict an exemplary locations for installation of a vacuum bag removal strip within a blade mold.
Figure 5:
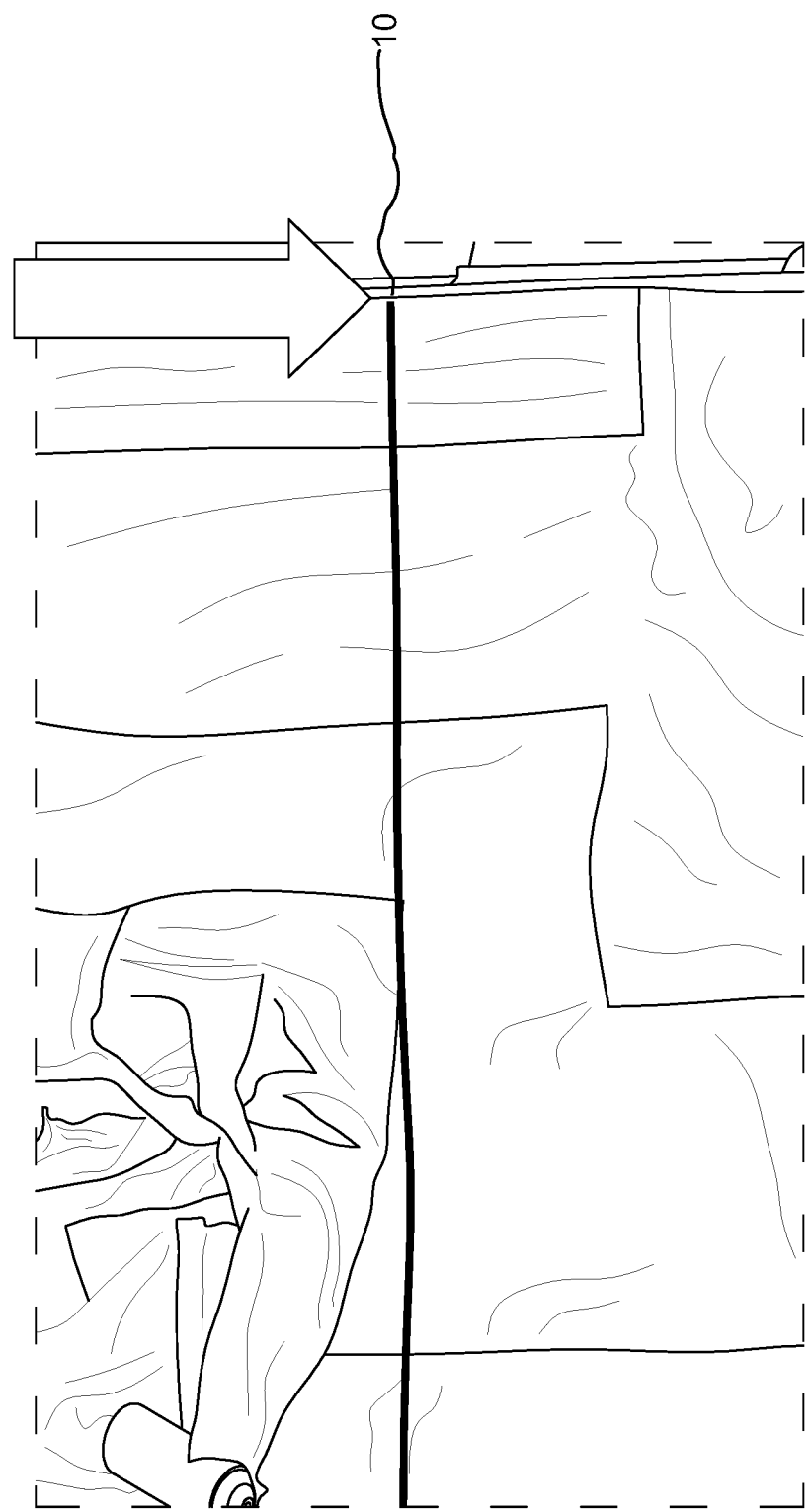
Figure 6A:
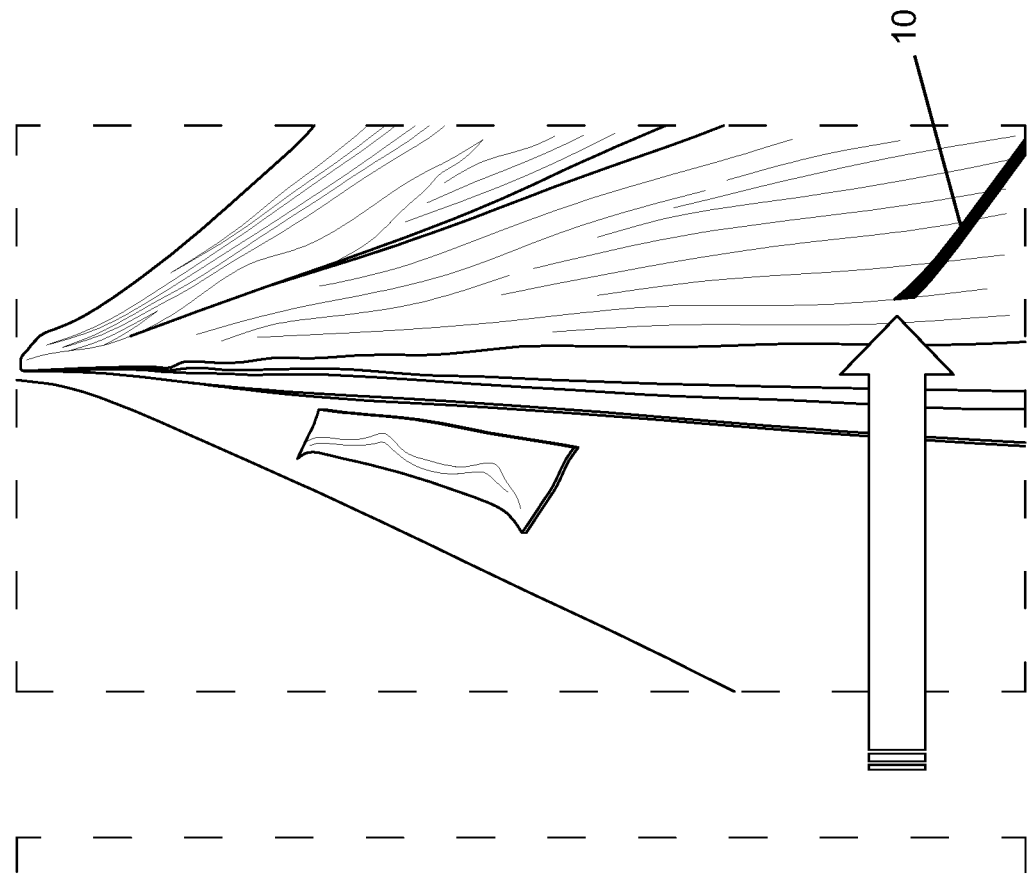
Figure 6B:
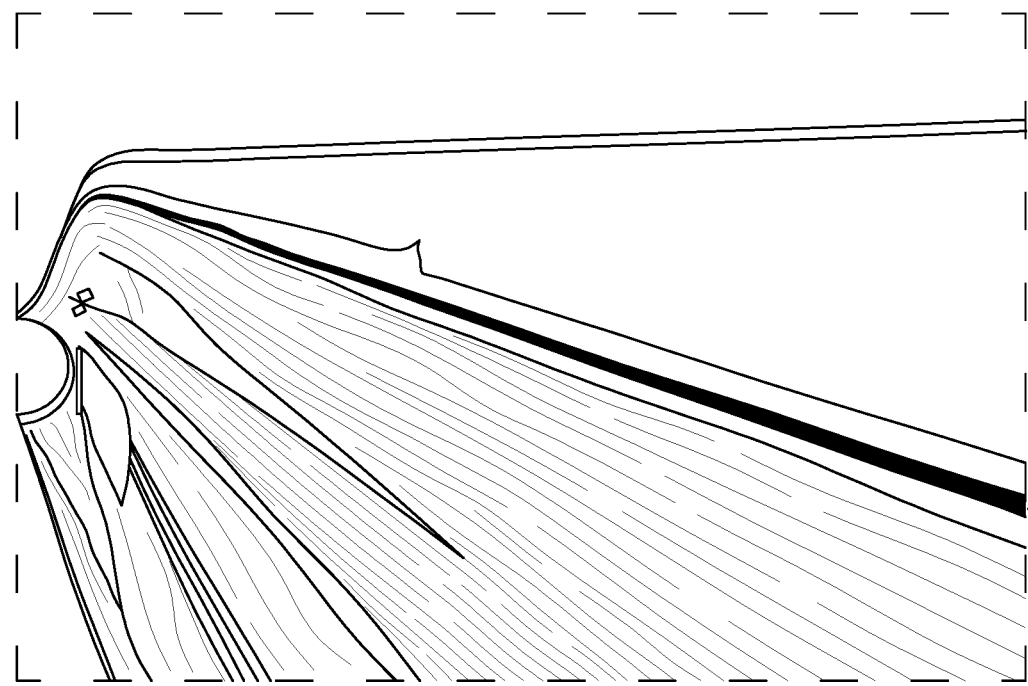

In some embodiments, additional removable strips (10, 20, 30) can be placed at the following locations (measured relative to the root end): 1,500 mm, 12,000 mm, and/or 27,500 mm as shown in FIG. 2. As shown in the illustrated embodiment, the removable zip strips can be placed to extend across the blade from mold split line to mold split line. In some embodiments, the removable zip strips can be positioned to ensure they do not extend past mold split lines (as shown in FIGS. 4-6). Similarly, the removable strips are positioned such that they do not extend up over the bond cap flange and do not extend out onto the mold flange. This approach can be employed as an abundance of caution approach, ensuring that no undesired puncturing/piercing of the bag occurs in these regions with sharp curvatures. However, it should be understood by artisans of ordinary skill that the present disclosure is not limited to such configurations, and that the removable strips can extend along any portion of the mold. As shown in exemplary FIG. 2, the removable strips can extend to the edge/boundary of the mold, if so desired.

During installation of the removable zip strips, a supply cart which dispenses the removable zip strips can be stationed near the root of mold, external to the mold. A segment of a zip strip is dispensed and dragged or carried to the tip of mold to ensure sufficient length is apportioned. Once the appropriate length is dispensed from the supply cart, the zip strip is installed onto the mold flange and cut at the 1.5 m mark from the root end. This is repeated for both leading edge and trailing edges of the blade mold. The removable strips that run in the chordwise direction can similarly be dispensed from a supply cart. The length desired can be determined by measuring the chord length (and accounting for non-linear geometry of the mold contour). Once the desired length is obtained, the zip strip can be cut or severed from the supply stock via scissors. The zip strip dispensing cart can be mobile and positioned alongside the blade mold on the shop floor. Alternatively, the zip strip dispensing cart can be elevated (either suspended from above, or provided with a scaffold or stilt-like feature to raise it off the shop floor) such that zip strips can be dispensed and allowed to fall into place under the guidance of a steering mechanism that is part of the dispenser, or by manual placement). As previously noted, during dispensing and positioning of the removable zip strip, care should be taken to ensure the zip strips do not extend or bridge over the auxiliary spar cap, nor extend past the mold split line outside of the blade.

In accordance with an aspect of the disclosure, the goal is to quickly remove consumables with natural breaks created by tearing up the zip strips. The zip strips can then serve a secondary function of serving as a means to consolidate and contain the consumables. This reduces the chance of foreign-object-debris from accidentally being left within the mold or manufactured component. Additionally, in some instances where the zip strip runs under pleats in the bag when debagging the operator can cut the bag to re-adjust and remove any undesired pleats.

During installation, the following material layers are positioned above the removable zip strips: Blue Perf; Omega; Brown Peal Ply; Green Flow; Breather; Tape; and the Vacuum bag. These are consumable materials that are used during infusion of the blade, and discarded after the resin has sufficiently cured. In some embodiments a non-sanding material can be provided under the removable strips, which serves to provide a textured surface on the, e.g. fiberglass, component. As shown in the exemplary embodiment of FIG. 2, the removable zip strip 10 is positioned above the glass fiber (90), which is positioned above the mold (80).

In some embodiments, an additional safeguard or quality control inspection can be included to ensure that the fiber, e.g. glass, is never installed over the removable strips. Similarly, safeguards can be implemented to ensure that non-sanding tape is never positioned over the removable strip. These safeguards can prohibit accidental, and permanent, bonding of the "removable" strip to the component being manufactured. In accordance with another aspect of the disclosure, the removable strips are provided with a uniform shape and size, which allows for rapid and universal application of the strip at any desired location on the mold.

Figure 7:
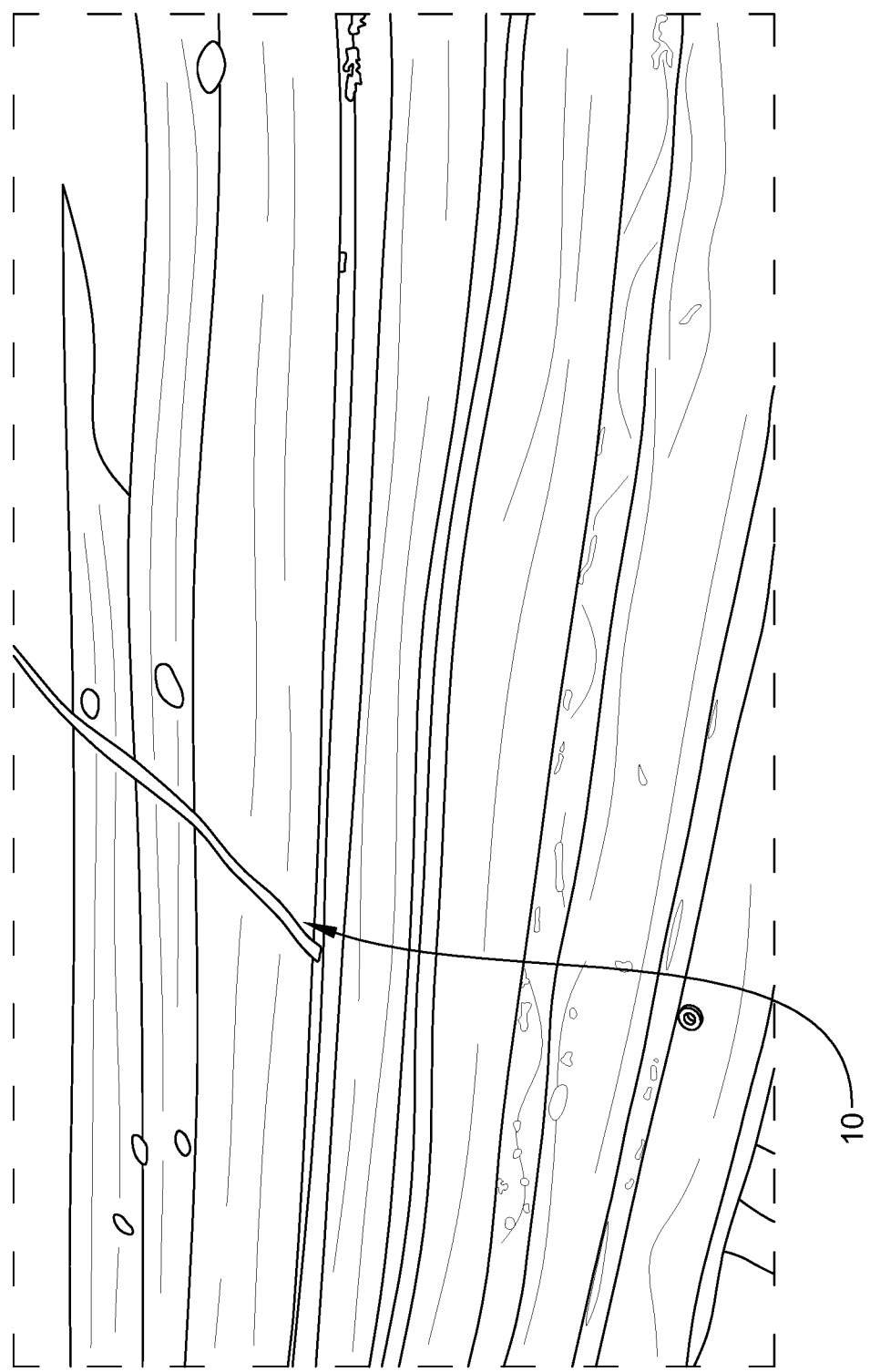
Figure 8:
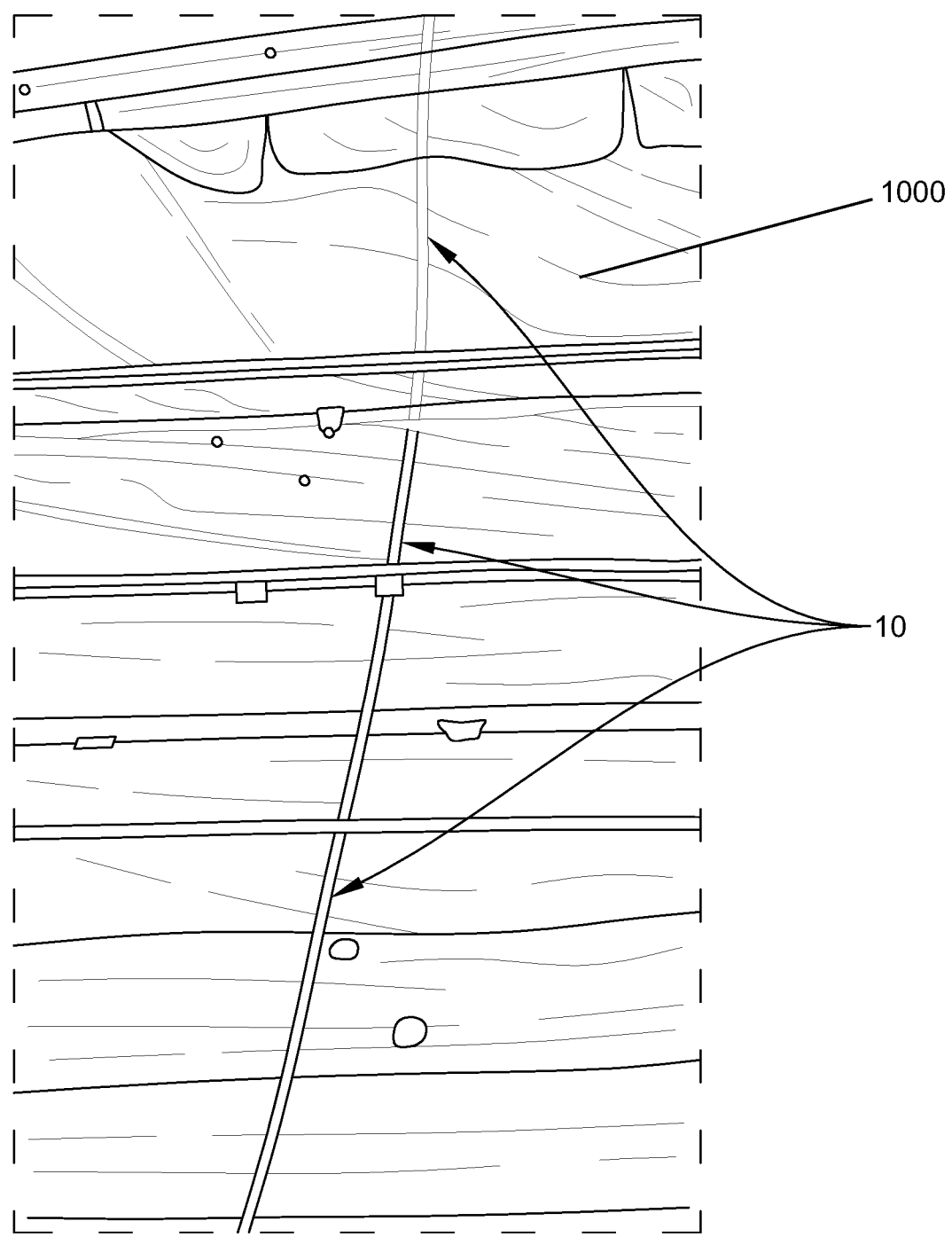
FIG. 8 depicts an exemplary locations for installation of a vacuum bag removal strip within a blade mold.

As shown in FIGS. 7-8, after curing of the composite structure, the "debagging" of the component can commence. In this exemplary embodiment, an incision is made in the bag 1000 to access the end of the removable zip strip (10). Then the operator can pull the strip upward to cut or tear through the upper layers of material (as described above). In some embodiments; a guide can be used to create a predefined flow path for the resin. This guide can take a variety of shapes, including an omega or "Ω" shape. In such embodiments, the removable strip does not break through the guide, when the resin is dispensed and cured. Accordingly, a lever, hammer, cutting device, or "F-bar" (i.e. upside down bar with 2 prongs on it in the shape of an upside down F) can be employed to break the guide so that the operator can continue to pull the removable strip from under the consumables to propagate the tear.

In accordance with another aspect of the disclosure, the chordwise removable zip strips can be dispensed independently and one at a time, or simultaneously. In some embodiments, the dispensing apparatus can include a gantry or guide mechanism that can be set to the desired location (relative to the blade root, or relative to adjacent dispensing locations) to ensure proper positioning of the zip strip.

The preferred setting of the presently disclosed technique is in the manufacture of epoxy and polyester resin parts. While the exemplary embodiment focuses on wind turbine blade manufacture, this process can be used in the fabrication of other composite parts e.g., marine, transportation, rides, sculpture, aircraft/military, civil infrastructure, construction, appliance/business, consumer, corrosion-resistant equipment, and electrical component installations.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of removing a vacuum bag from a wind turbine blade mold comprising:
   forming a wind turbine blade component within a mold;
   providing at least one removable strip, the at least one removable strip disposed around at least a portion of a perimeter of the wind turbine blade component,
   disposing at least one consumable layer above the at least one removable strip;
   disposing a portion of a vacuum bag above the at least one removable strip;
   pulling the at least one removable strip, wherein a pulling force tears through the at least one consumable layer and the vacuum bag.

2. The method of claim 1, wherein the at least one removable strip tears through the at least one consumable layer in a predetermined path.

3. The method of claim 1, wherein the at least one removable strip has a thickness of approximately 0.028 inches, a width of approximately 0.5 inches, a break strength of approximately 820 pounds, and a melting point of approximately 490° Fahrenheit.

4. The method of claim 1, wherein the at least one removable strip is placed directly on glass.

5. The method of claim 1, wherein once all of the at least one removable strip is removed, the at least one consumable layer and vacuum bag are tied with the at least one removable strip.

6. The method of claim 1, wherein the at least one removable strip imparts a recess in the wind turbine blade component after removal.

7. The method of claim 6, further comprising applying tacky tape at the recess.

8. The method of claim 1, wherein the at least one removable strip is disposed around the mold on a clamp edge between a top clamp edge and a bottom clamp edge.

9. The method of claim 1, wherein the at least one removable strip has a first end disposed at 1.5 m from a root end of the wind turbine blade component and extends to a tip on both a leading edge and trailing edge side of the mold.

10. The method of claim 1, wherein the at least one removable strip includes a handle at an end of the at least one removable strip.

11. The method of claim 1, wherein the at least one removable strip is disposed at an approximate distance of one of 1,500 mm, 12,000 mm, or 27,500 mm from a root end.

12. The method of claim 1, wherein the at least one removable strip is dispensed from a root of the mold to a tip.

13. The method of claim 12, wherein the at least one removable strip is dispensed laterally into the mold.

14. The method of claim 12, wherein the at least one removable strip is dispensed downwardly into the mold.

15. The method of claim 12, wherein a spar cap and split lines of the mold remain free of the at least one removable strip.

16. The method of claim 1, wherein a segment of the at least one removable strip is dispensed proximate to a root of the mold and extended to the tip of the mold.

17. The method of claim 1, wherein the at least one removable strip is installed onto a flange of the mold and cut at the 1.5 m mark from a root of the mold.

18. The method of claim 1, wherein an opening is formed in the vacuum bag to access an end of the at least one removable strip.

19. The method of claim 1, further comprising a guide to create a predefined flow path for resin distribution.

20. The method of claim 19, wherein the at least one removable strip does not break through the guide upon removal.

* * * * *